United States Patent
Jiang et al.

(10) Patent No.: US 10,965,601 B2
(45) Date of Patent: Mar. 30, 2021

(54) SENDER SIDE ASSISTED FLOW CLASSIFICATION

(71) Applicant: VMware, Inc., Palo Alto, CA (US)

(72) Inventors: Wenyi Jiang, Palo Alto, CA (US); Guolin Yang, San Jose, CA (US); Boon Seong Ang, Saratoga, CA (US); Ying Gross, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 151 days.

(21) Appl. No.: 16/110,909

(22) Filed: Aug. 23, 2018

(65) Prior Publication Data

US 2020/0067842 A1 Feb. 27, 2020

(51) Int. Cl.
*G06F 9/455* (2018.01)
*H04L 12/851* (2013.01)
*H04L 29/06* (2006.01)
*H04L 12/749* (2013.01)

(52) U.S. Cl.
CPC ...... *H04L 47/2441* (2013.01); *G06F 9/45558* (2013.01); *H04L 45/741* (2013.01); *H04L 47/2483* (2013.01); *H04L 69/22* (2013.01); *G06F 2009/45595* (2013.01)

(58) Field of Classification Search
CPC .............. H04L 47/2441; H04L 45/741; H04L 47/2483; H04L 69/22; G06F 9/45558; G06F 2009/45595
See application file for complete search history.

(56) References Cited

U.S. PATENT DOCUMENTS

| 2004/0125807 A1* | 7/2004 | Liu ........................ H04L 69/16 370/395.32 |
| 2017/0149583 A1* | 5/2017 | Hira ....................... H04L 69/22 |

OTHER PUBLICATIONS

Han et al. SoftNIC: A Software NIC to Augment Hardware. [online] pp. 1-15. Retrieved From the Internet <http://www-users.cselabs.umn.edu/classes/Fall-2017/csci8211/Papers/NFV%20%20Bess-SoftNIC-EECS-2015-155.pdf> (Year: 2015).*
Vmware, "Understanding BUM Frame Replication Modes", http://pubs.vmware.com/nsxt-11/index.jsp?topic=%2Fcom.vmware.nsxt.admin.doc%2FGUID-C3BCEE09-B361-41C0-8FA3-46412D08BCF8.html 2 pgs, dated Jun. 22, 2017.
Vmware, "NSX-T Networking Best Practices", NSX-T 1.1, dated 2017, 21 pages.
Lee, Brandon, "VMware NSX-V vs NSX-T Comparison", https://www.vembu.com/blog/vmware-nsx-v-vs-nsx-t-comparison/, dated Mar. 20, 2018, 4 pages.
J. Gross, Ed. et al., "Geneve: Generic Network Virtualization Encapsulation" -draft-ietf-nvo3-geneve-05, Network Working Group, dated Sep. 13, 2017, 26 pages.
"Geneve", https://www.redhat.com/en/blog/what-geneve, dated Jun. 22, 2017, 3 pages.

* cited by examiner

*Primary Examiner* — Emerson C Puente
*Assistant Examiner* — Jonathan R Labud

(57) ABSTRACT

A method for a sender side assisted flow classification is disclosed. In an embodiment, a method comprises detecting a packet by a network virtualization layer engine implemented in a hypervisor on a sender side of a virtualization computer system; and determining, by the network virtualization layer engine, whether the packet requires special processing. In response to determining that the packet requires special processing, a special processing flag is inserted in a certain field of an outer header of the packet; and the packet is forwarded toward a destination of the packet for a PNIC on a receiver side to process the packet.

20 Claims, 3 Drawing Sheets

SENDER SIDE ASSISTED FLOW CLASSIFICATION

BACKGROUND

In software defined networking ("SDN"), packets may be exchanged between virtual machines ("VMs") on different hosts through tunnels implemented by encapsulating and decapsulating packets using a particular tunneling protocol such as Geneve. In this case, a network virtualization stack implemented on the host might support a flow classification and Geneve encapsulation/decapsulation offload to a physical network interface card ("PNIC"). When a PNIC processes a received packet, the PNIC parses the packet, extracts flow keys (i.e., a five-tuple, a six-tuple, etc.) from, for example, an Ethernet outer header and an IP outer header of the packet and matches the extracted flow keys with the flow keys for which the network virtualization processing has been already pre-programmed. If a match is found, then the PNIC discards, from the packet, the outer headers (for example, an Ethernet outer header and an IP outer header) and copies the remaining inner portion of the packet from the PNIC's memory to a network virtualization stack or directly to a guest virtual machine.

But if a packet requires special processing to be performed by a hypervisor, then a PNIC should execute a different process: instead of discarding an outer headers from the packet and coping only an inner packet from the PNIC's memory to a network virtualization stack or to a guest VM, the PNIC should copy the entire packet to the network virtualization stack, not just the inner packet. This would allow the hypervisor to access the entire packet including the outer header information and perform the special processing on the packet based on that information. Examples of the special processing include a MTEP replication, flow tracing, DHCP snooping, aging MAC addresses learned on a tunnel endpoint, and pre-programing a virtualization processing offload for a packet.

Special processing requested for a packet is usually indicated by including either Geneve specific options in a "variable length options" field in a Geneve header of the packet, or customized options in, for example, a L7 payload of the packet. To be able to recognize the Geneve specific options and/or the customized options in a packet, a PNIC would need to support a packet classifier configured to access such options in the packet. Unfortunately, most of the PNICs support the classifiers that can access only up to the inner L4 headers, but not the Geneve options in the Geneve header or the customized options in the L7 payload. Since, for decapsulation offloading, a typical PNIC decapsulates the packet, discards outer headers (from outer L2 headers to the Geneve header) from the packet, and copies the remaining inner portion of the packet to a network virtualization stack, the inner packet is usually stripped of the Geneve options and other customized special processing options. Thus, if a packet requires special processing, a hypervisor cannot perform the special processing on the packet because the inner portion of the packet that is copied to the hypervisor's network virtualization stack does not include the special processing options.

Therefore, there is a need to provide a method for assisting PNICs in identifying the packets that require special processing and preserving special processing options in such packets.

SUMMARY

In an embodiment, techniques are described for a sender side assisted flow classification of packets in visualization environments. The sender side assisted flow classification includes enabling the flow classification on a sender side of a virtualization computer system and using the enabled, sender side assisted flow classification on a receiver side of the system so that special processing of packets can be performed when needed while still offloading packet decapsulation to physical NICs when special processing is not required.

To enable a sender side assisted flow classification on a sender side, a network virtualization engine of a hypervisor on a sender side inserts a special processing flag in a certain field of an outer header of the packet that requires special processing. The flag itself does not, however, indicate the type of the special processing.

On a receiver side, upon receiving the packet, a PNIC parses the outer header of the packet to determine if the special processing flag has been inserted, and if it has, then the PNIC does not decapsulate the packet. Because the packet is not decapsulated, Geneve options and/or customized special processing options included in the packet are preserved. Examples of the certain field in which the special processing flag may be inserted include an identification field of an IPv4 outer header of the packet, and/or a flow label field of an IPv6 outer header of the packet.

In an embodiment, a sender side assisted flow classification is implemented on hypervisors of each host of a virtualization computer system. For example, a hypervisor implemented in a first host may provide a sender side assistance for the packets that require special processing on a second host. A PNIC implemented in the second host may take advantage of the enabled sender side assistance, and upon receiving a packet, may check if the packet has a special processing flag inserted, and if it has, the PNIC may preserve the special processing options in the packet to allow the special processing of the packet. Similarly, a hypervisor implemented in the second host may provide a sender side assistance for the packets that require special processing on the first host. A PNIC implemented in the first host may take advantage of the enabled sender side assistance, and upon receiving a packet, may check if the packet has a special processing flag inserted, and if it has, the PNIC may preserve the special processing options in the packet to allow the special processing of the packet.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
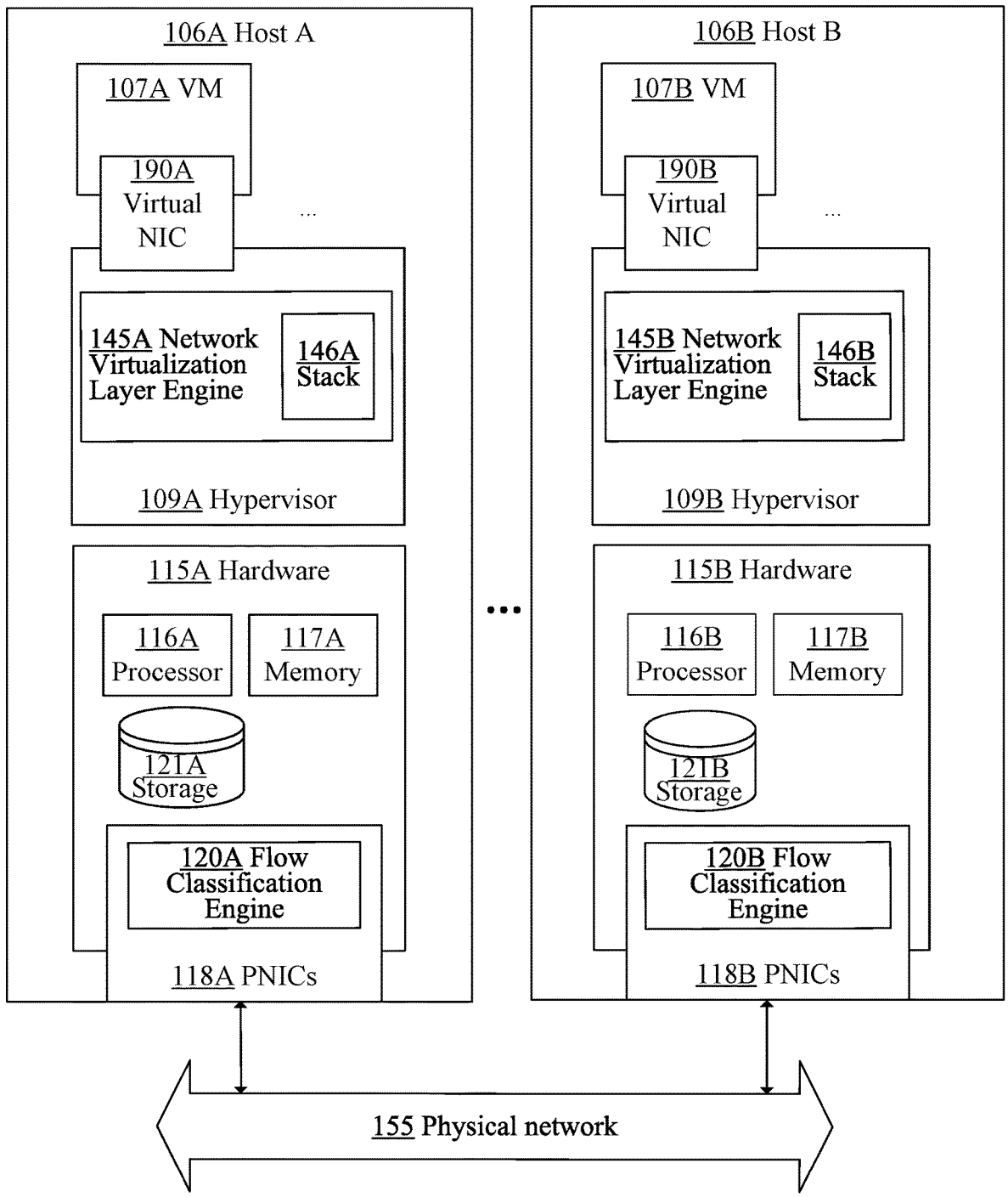
FIG. 1 is a block diagram depicting an example physical implementation view of an example logical network environment for implementing a sender side assisted flow classification.

FIG. 1 is a block diagram depicting an example physical implementation view of an example logical network environment for implementing a sender side assisted flow classification. In the depicted example, environment 10 includes two or more hosts 106A-106B, and one or more physical networks 155.

Hosts 106A-106B are used to implement logical routers, logical switches and VMs. Hosts 106A-106B are also referred to as computing devices, host computers, host devices, physical servers, server systems or physical machines. Each host may be configured to support several VMs. In the example depicted in FIG. 1, host 106A is configured to support a VM 107A, while host 106B is configured to support a VM 107B. Additional VMs may also be supported by hosts 106A-106B.

Virtual machines 107A-107B are executed on hosts 106A-106B, respectively, and are examples of virtualized computing instances or workloads. A virtualized computing instance may include an addressable data compute node or an isolated user space instance, often referred to as name space containers. VMs 107A-107B may implement edge nodes, edge node gateways, and the like.

Host 106A may include a hardware component 115A, while host 106B may include a hardware component 115B. Hardware component 115A may include one or more processors 116A, one or more memory units 117A, one or more PNICs 118A, and one or more storage devices 121A. Hardware component 115B may include one or more processors 116B, one or more memory units 117B, one or more PNICs 118B, and one or more storage devices 121B.

PNIC 118A may include a flow classification engine 120A, while PNIC 118B may include a flow classification engine 120B. Flow classification engines 120A-120B may comprise ASIC devices, FPGA devices, and/or processors that execute microcode or firmware that are configured to perform the sender side assisted flow classification on a receiver side.

Hosts 106A-106B may be configured to support execution of hypervisors 109A and 109B, respectively. Hosts 106A-106B may be also configured with virtual network interface cards ("VNICs") 190A-190B, respectively. A VNIC is a software-based network interface that a VM may use to communicate with other network components. A VNIC is assigned a MAC address, and a VM may use a VNIC to communicate with other VMs, hypervisors, or other network end-points reachable from the physical network. In the depicted example, VM 107A may use VNIC 190A to communicate with hypervisor 109A, hypervisor 109B and/or VM 107B, while VM 107B may use VNIC 190B to communicate with hypervisor 109B, hypervisor 109A and/or VM 107A.

Hypervisors 109A-109B are software layers or components that each supports the execution of multiple VMs, such as VMs 107A-107B. Hypervisors 109A-109B may be configured to implement virtual switches and forwarding tables (not shown) that facilitate data traffic between VMs 107A-107B. In certain embodiments, the virtual switches and other hypervisor components reside in a privileged virtual machine (sometimes referred to as a "Domain Zero" or "the root partition") (not shown). Hypervisors 109A-109B may also maintain mappings between underlying hardware 115A-115B, respectively, and virtual resources allocated to the respective VMs.

In an embodiment, hypervisors 109A-109B are configured to support execution of network virtualization layer engines 145A, 145B, respectively.

2. Network Virtualization Layer Engines

Network virtualization layer engines 145A-145B may be configured to communicate with VNICs 190A-190B, respectively, and hardware components 115A-115B. Network virtualization layer engines may include virtual switches and other components of managed forwarding elements (not depicted in FIG. 1). Managed forwarding elements may be software components configured to perform forwarding of data packets that are received from, or sent to, VMs. For example, if a managing forwarding element executing on host 106A receives a data packet from VM 107A, then the managing forwarding element may perform the processing of a logical switch, which is logically coupled to VM 107A, to direct the packet to, for example, VM 107B.

In an embodiment, network virtualization layer engines 145A-145B include data-path components configured to implement a sender side assisted flow classification on a sender side and to process network packets. Network virtualization layer engines 145A-145B may be configured to identify packets that require special processing and to insert a special processing flag in a certain field of the outer headers of such packets. An example process performed by network virtualization layer engines 145A-145B is described in FIG. 2.

Determining or identifying the packets that require special processing may be implemented in several ways. For example, the decision process may be implemented in the code that forms a network virtualization layer engine. The code may be configured to parse an outer header of a packet to identify a destination MAC address of the packet. Because the destination MAC address of the multicast/broadcast packets indicates whether the packets belongs to the Ethernet multicast or broadcast, the network virtualization layer engine may, based on the destination MAC address, identify if the packet is a multicast/broadcast packet, and if it is, insert a special processing flag in the certain field of the outer header of the packet. However, if the destination MAC address of the packet does not indicate that the packet is a multicast/broadcast packet, then the network virtualization layer engine may not insert the special processing flag in the outer header of the packet.

Virtual switches of network virtualization layer engines 145A-145B may be configured to detect Broadcast, Unknown Unicast, Multicast ("BUM") traffic, which usually requires special processing on a receiver side. For example, if an L2 virtual switch of network virtualization layer engine 145A detects a packet that belongs to the BUM traffic destined to VM 107B, then network virtualization layer engine 145A may insert a special processing flag in a certain field of the outer header of the BUM packet to indicate to PNIC 118B on a receiver side that the packet requires special processing.

In an embodiment, network virtualization layer engines 145A-145B determine or identify the packets that require special processing based on run time data. For example, the engines may parse a destination MAC address of a packet to determine whether the packet is an unknown unicast and/or either statically configured or dynamically learned.

In an embodiment, network virtualization layer engines 145A-145B determine or identify the packets that require special processing based on configuration information that a user or a system administrator specified for the packets through a control path. For example, some firewall rules may require special processing of all packets that belong to a certain L4 flow. Hence, upon receiving a packet, network virtualization layer engine 145A may determine whether the received packet belongs to the certain L4 flow, and if it does, then network virtualization layer engine 145A may insert a special processing flag in a certain field of the outer header of the packet indicate to PNIC 118B on a receiver side that the packet requires special processing.

Network virtualization layer engines 145A-145B may be also configured to perform encapsulation or decapsulation of packets for an overlay network and perform the firewall processing on the packets. Network virtualization layer engines 145A-145B may also include network monitoring and debugging tools. For example, they may be configured to generate packets that trace network paths.

Network virtualization layer engines 145A-145B may include stacks 146A-146B, respectively. Stacks 146A-146B, also referred to as special packet handling modules, are software modules implemented as part of network virtualization layer engines 145A-145B, respectively. Stacks 146A-146B are sub-components of 145A-145B, respectively, and are configured to perform the special case handling that cannot otherwise be performed on packets by hardware of PNICs 118A-118B, respectively. Typically, network virtualization layer engines 145A-145B encompass the data-path software components and interact with PNICs 118A-118B to offload some processing to the PNICs. However, when some special processing cannot be offloaded to the PNICs, that special processing of packets may be handled by stacks 146A-146B.

3. Flow Classification Engines

Flow classification engines 120A-120B may be implemented as hardware components of PNICs 118A-118B, respectively. Usually, flow classification engines 120A-120B are implemented purely in hardware or implemented in hardware that includes microcode. For example, a hardware-implemented flow classification engine may include and execute microcode programmed to classify data flows based on the sender side assistance provided by network virtualization layer engines 145A-145B. In other embodiments, a flow classification engine may include firmware that runs on embedded processors and that is configured to perform the sender side assisted flow classification. The implication of such implementations is that the implementations may have limited flexibility and programmability. Therefore, the sender side assisted flow classification approach relies heavily on support that network virtualization layer engines 145A-145B can provide to PNICs 118A-118B so that performing the sender side assisted flow classification by PNICs 118A-118B is as light as possible.

4. Sender Side Assisted Flow Classification

In an embodiment, an approach includes inserting, by a network virtualization layer engine executing on a hypervisor on a sender side, for a packet that requires special processing, a special processing flag in a certain field of an outer header of the packet to indicate to PNICs on a receiver side that the packet requires the special processing. The special processing flag indicates that the packet requires the special processing, but it does not, however, indicate the type of special processing that the packet requires. The type of special processing is encoded in either a Geneve header or a L7 payload of the packet.

Upon receiving a packet, a PNIC on a receiver side parses the packet to determine whether the packet includes a special processing flag in an outer header of the packet. If the packet includes the special processing flag, then the PNIC does not decapsulate the packet. Instead, the PNIC copies the entire packet from the PNIC's memory to a network virtualization stack. However, if the packet does not include the special processing flag, then the PNIC decapsulates the packet and processes it as usually.

5. Special Processing Flags

A special processing flag is a flag that, if inserted in a packet, indicates that the packet requires special processing. The special processing flag, does not, however, indicate the type of special processing that needs to be performed on the packet. The special processing flag is set in that portion of a header of the packet that the PNIC 118A can easily detect and recognize.

If a packet includes an IPv4 outer header, then a special processing flag for the packet that requires special processing is set on a certain bit in an identification field of the IPv4 outer header of the packet. The identification field of an IPv4 outer header includes bits 32-48 in the IPv4 outer header. Since the identification field of the outer IPv4 header is not otherwise used by PNICs, selecting a certain bit within the identification field and using that certain bit to mark the packets that require special processing is harmless for other types of processing performed by the PNICs. Most of the classifiers used by the PNICs are configured to recognize the identification field in the IPv4 outer header. Therefore, if network virtualization layer engine 145B inserts a special processing flag in the identification field of the IPv4 outer header, then flow classification engine 120A of PNIC 118A may recognize that flag.

If a packet includes an IPv6 outer header, then a special processing flag for the packet that requires special processing is inserted on a certain bit in a flow label field of IPv6 outer header of the packet. The flow label field of an IPv6 outer header includes bits 12-31 in the IPv6 outer header. Since the flow label field of the IPv6 outer header is not otherwise used by PNICs, selecting a certain bit within the flow label field and using that certain bit to mark the packets that require special processing is harmless for other types of processing performed by the PNICs. Most of the classifiers used by the PNICs are configured to recognize the flow label field in the IPv6 outer header. Therefore, if network virtualization layer engine 145B inserts the special processing flag in the flow label field of the IPv6 outer header, then flow classification engine 120A of PNIC 118A may recognize that flag.

6. Sender Side Assisted Flow Classification on a Sender Side

Figure 2:
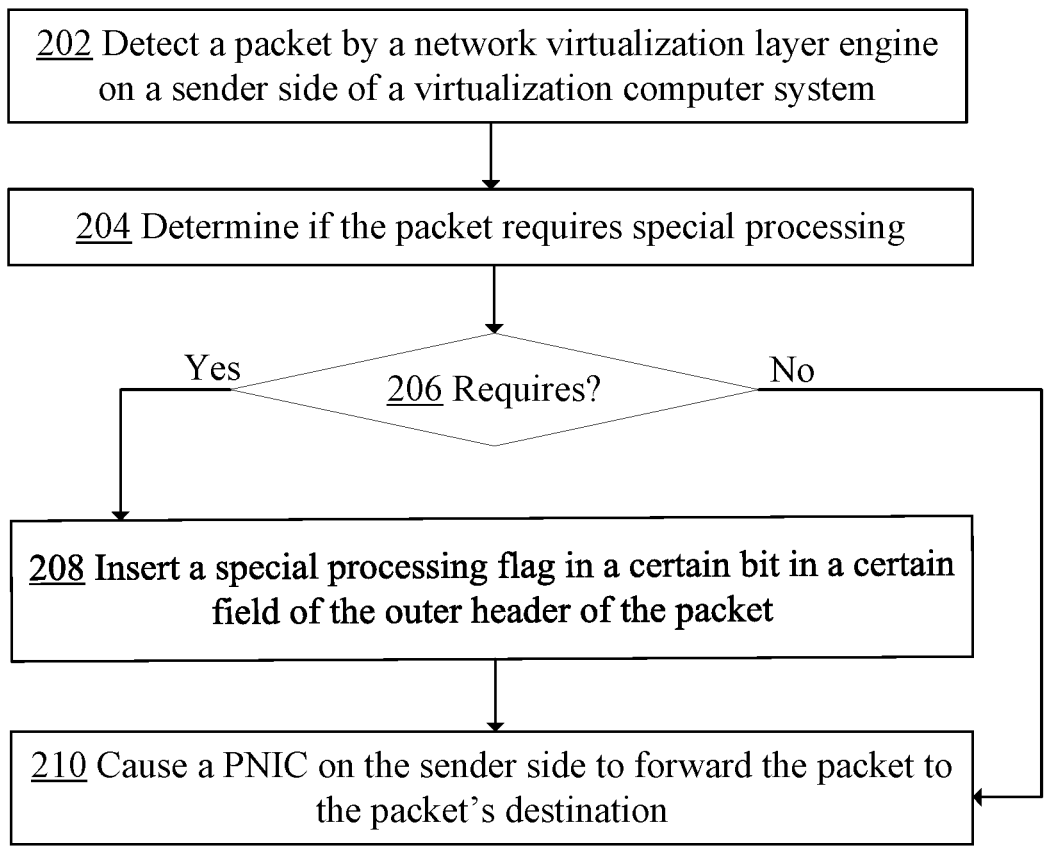
FIG. 2 is an example flow chart for implementing a sender side assisted flow classification on a sender side.

FIG. 2 is an example flow chart for implementing a sender side assisted flow classification on a sender side. In an embodiment, network virtualization layer engine 145B inserts a special processing flag in outer headers of the packets that require special processing so that flow classification engine 120A implemented in a PNIC 118A on a receiver side can detect the special processing flag in the packets that require the special processing, and thus preserve Geneve options and/or customized special processing options in such packets.

The techniques may be also implemented in the opposite direction: a sender side may be network virtualization layer engine 145A implemented in hypervisor 109A, and a receiver side may be flow classification engine 120B. In this case, network virtualization layer engine 145A inserts a special processing flag in outer headers of the packets that require special processing so that flow classification engine 120B implemented in a PNIC 118B on the receiver side can detect the special processing flag in the packets that require the special processing, and thus preserve Geneve options and/or customized special processing options in such packets.

In step 202, a network virtualization layer engine on a sender side detects a packet.

In step 204, the network virtualization layer engine determines whether the packet requires special processing. Different ways for the network virtualization layer engine to make that determination have been described above.

If, in step 206, the network virtualization layer engine determined that the packet requires special processing, then the network virtualization layer engine proceeds to performing step 208; otherwise, the network virtualization layer engine proceeds to performing step 210.

In step 208, the network virtualization layer engine inserts a special processing flag in a certain field of the outer header of the packet. Examples of the certain fields have been described above.

However, if the network virtualization layer engine determined that the packet does not require special processing, then, in step 210, the network virtualization layer engine processes the packet as usual. That may include decapsulating the packet and forwarding an inner portion of the packet to VM 107A or stack 146A.

The special processing flag is set, on the sender side, in the packet that requires special processing to indicate to PNIC 118A on a receiver side that the packet requires special processing, and to prevent PNIC 118A from discarding the outer headers of the packet.

7. Sender Side Assisted Flow Classification on a Receiver Side

Figure 3:
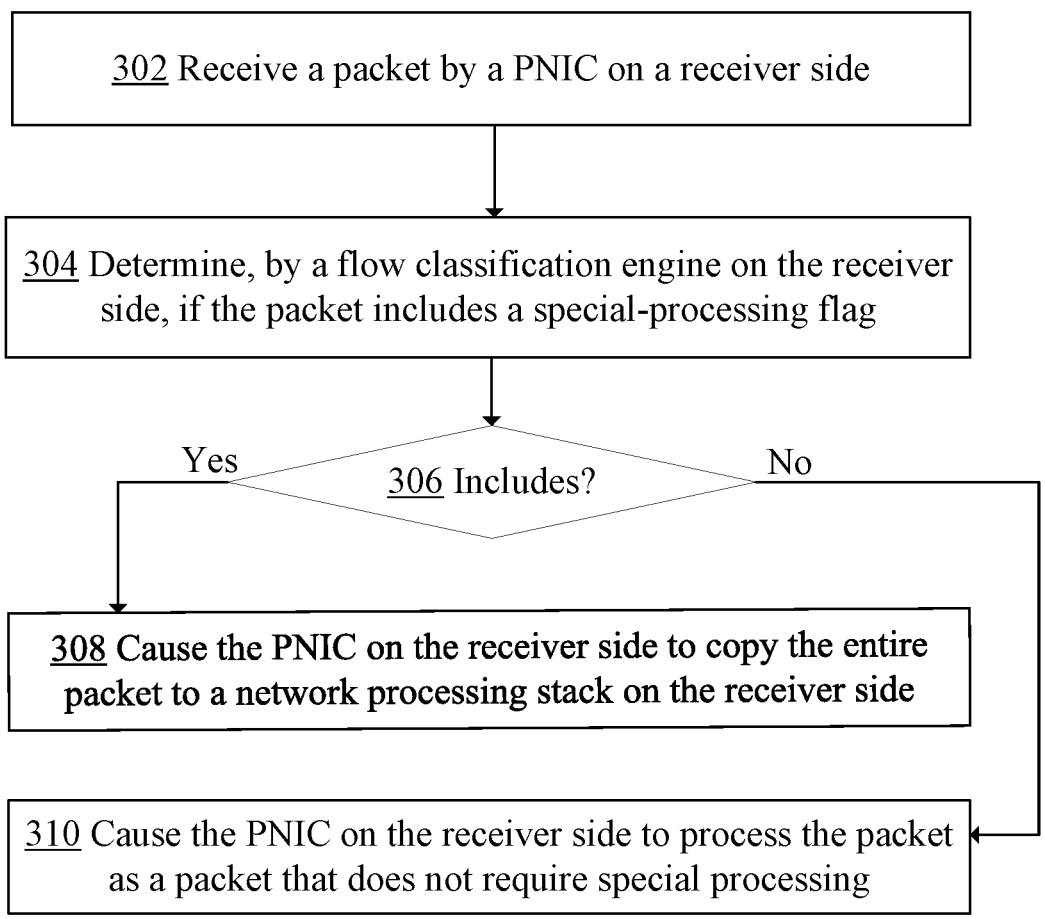
FIG. 3 is an example flow chart for implementing a sender side assisted flow classification on a receiver side.

FIG. 3 is an example flow chart for implementing a sender side assisted flow classification on a receiver side.

In step 302, a PNIC on a receiver side receives a packet.

In step 304, the flow classification engine of the PNIC on the receiver side determines whether the packet has a special processing flag inserted in a certain field of the outer header of the packet.

If, in step 306, the flow classification engine determined that the packet has the special processing flag inserted, then step 308 is performed; otherwise, step 310 is performed.

In step 308, the flow classification engine causes the PNIC to copy the entire packet from the PNIC's memory to a stack on the receiver side. Hence, the PNIC does not decapsulate the packet, but instead, the PNIC copies the entire packet from the PNIC's memory to the stack.

However, if the flow classification engine determined that the packet does not have the special processing flag inserted, then, in step 310, the flow classification engine causes the PNIC to process the packet as usually, i.e., extract flow keys from the packet, match the extracted flow keys with the flow keys for which the network virtualization processing has been already pre-programmed, and so forth.

8. Improvements Provided by Certain Embodiments

In an embodiment, an approach provides mechanisms for providing sender side assisted flow classification of packets. If a packet requires special processing, then a network virtualization layer engine of a hypervisor implemented on a sender side inserts a special processing flag in an outer header of the packet so that a PNIC on a receiver side may detect presence of the flag and copy the entire packet, not just a decapsulated packet, from the PNIC's memory to the hypervisor's memory.

The approach provides mechanisms for assisting PNICs in identifying the packets that require special processing and thus should not be stripped of Geneve options and other customized options indicating the special processing.

9. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

10. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in diverse ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a sender side assisted flow classification, the method comprising:
    receiving a packet;
    parsing an outer header of the packet to determine whether a special processing flag has been inserted in a certain field of an outer header of the packet;
    in response to determining that the special processing flag has been inserted in the certain field of the outer header of the packet, copying an entirety of the packet including outer headers of the packet from memory of a physical network interface card ("PNIC") to a virtualization stack of a hypervisor;
    in response to determining that the special processing flag has not been inserted in the certain field of the outer header of the packet;
    decapsulating the packet to obtain an inner packet; and
    copying the inner packet from the memory of the PNIC to either a guest virtual machine or the virtualization stack of the hypervisor.

2. The method of claim 1, further comprising:
    detecting the packet by a network virtualization layer engine implemented in a second hypervisor on a sender side of a virtualization computer system;
    determining, by the network virtualization layer engine, whether the packet requires special processing;
    in response to determining that the packet requires special processing, inserting the special processing flag in the certain field of the outer header of the packet; and
    forwarding the packet toward a destination of the packet.

3. The method of claim 1, wherein the special processing flag is inserted in a particular bit of an identification field of an IPv4 outer header.

4. The method of claim 1, wherein the special processing flag is inserted in a particular bit of a flow label field of an IPv6 outer header.

5. The method of claim 2, wherein the determining whether the packet requires the special processing comprises receiving instructions, from a local control plane, that the packet needs to be specially processed;
    wherein the special processing includes one or more of: a multicast tunnel endpoint ("MTEP") replication, flow tracing, DHCP snooping, aging MAC addresses learned on a tunnel endpoint ("TEP"), or pre-programing a virtualization processing offload for the packet; and
    wherein the special processing is encoded in the packet in a variable length option field of a Geneve header of the packet, or in a Layer 7 payload of the packet.

6. The method of claim 2, further comprising: in response to determining that the packet does not require special processing, forwarding the packet toward the destination of the packet.

7. The method of claim 2, wherein the network virtualization layer engine is a data-path component configured to identify packets that require special processing based on one or more of: content of: destination MAC addresses of the packets, rules defined for the packets, or configuration instructions defined for the packets in control planes.

8. One or more non-transitory computer-readable storage media storing one or more computer instructions which, when executed by one or more processors, cause the one or more processors to perform:
    causing a physical network interface card ("PNIC") on a receiver side of a virtualization computer system to perform:
        receiving a packet;
        parsing an outer header of the packet to determine whether a special processing flag has been inserted in a certain field of an outer header of the packet;
        in response to determining that the special processing flag has been inserted in the certain field of the outer header of the packet, copying an entirety of the packet including outer headers of the packet from memory of the PNIC to a virtualization stack of a hypervisor;
        in response to determining that the special processing flag has not been inserted in the certain field of the outer header of the packet:
            decapsulating the packet to obtain an inner packet; and
            copying the inner packet from the memory of the PNIC to either a guest virtual machine or the virtualization stack of the hypervisor.

9. The one or more non-transitory computer-readable storage media of claim 8, comprising additional instructions which, when executed by the one or more processors, cause the one or more processors to perform:
    detecting the packet by a network virtualization layer engine implemented in a hypervisor on a sender side of the virtualization computer system;
    determining, by the network virtualization layer engine, whether the packet requires special processing;
    in response to determining that the packet requires special processing, inserting a special processing flag in a certain field of an outer header of the packet; and
    forwarding the packet toward a destination of the packet.

10. The one or more non-transitory computer-readable storage media of claim 8, wherein the special processing flag is inserted in a particular bit of an identification field of an IPv4 outer header.

11. The one or more non-transitory computer-readable storage media of claim 8, wherein the special processing flag is inserted in a particular bit of a flow label field of an IPv6 outer header.

12. The one or more non-transitory computer-readable storage media of claim 9, comprising additional instructions which, when executed by the one or more processors, cause the one or more processors to perform:
  receiving instructions, from a local control plane, that the packet needs to be specially processed;
  wherein the special processing includes one or more of: a multicast tunnel endpoint ("MTEP") replication, flow tracing, DHCP snooping, aging MAC addresses learned on a tunnel endpoint ("TEP"), or pre-programing a virtualization processing offload for the packet; and
  wherein the special processing is encoded in the packet in a variable length option field of a Geneve header of the packet, or in a Layer 7 payload of the packet.

13. The one or more non-transitory computer-readable storage media of claim 9, comprising additional instructions which, when executed by the one or more processors, cause the one or more processors to perform: in response to determining that the packet does not require special processing, forwarding the packet toward the destination of the packet.

14. The one or more non-transitory computer-readable storage media of claim 9, wherein the network virtualization layer engine is a data-path component configured to identify packets that require special processing based on one or more of: content of: destination MAC addresses of the packets, rules defined for the packets, or configuration instructions defined for the packets in control planes.

15. A hypervisor comprising:
  one or more processors;
  one or more memory units; and
  one or more non-transitory computer-readable storage media storing one or more computer instructions which, when executed by the one or more processors, cause the one or more processors to perform:
  receiving a packet;
  parsing an outer header of the packet to determine whether a special processing flag has been inserted in a certain field of an outer header of the packet;
  in response to determining that the special processing flag has been inserted in the certain field of the outer header of the packet, copying an entirety of the packet including outer headers of the packet from memory of a physical network interface card ("PNIC") to a virtualization stack of the hypervisor;
  in response to determining that the special processing flag has not been inserted in the certain field of the outer header of the packet:
    decapsulating the packet to obtain an inner packet; and
    copying the inner packet from the memory of the PNIC to either a guest virtual machine or the virtualization stack of the hypervisor.

16. The hypervisor of claim 15,
  wherein the special processing flag is inserted in the certain field of the outer header of the packet in response to determining that the packet requires special processing.

17. The hypervisor of claim 15, wherein the special processing flag is inserted in a particular bit of an identification field of an IPv4 outer header.

18. The hypervisor of claim 15, wherein the special processing flag is inserted in a particular bit of a flow label field of an IPv6 outer header.

19. The hypervisor of claim 15,
  wherein the special processing includes one or more of: a multicast tunnel endpoint ("MTEP") replication, flow tracing, DHCP snooping, aging MAC addresses learned on a tunnel endpoint ("TEP"), or pre-programing a virtualization processing offload for the packet; and
  wherein the special processing is encoded in the packet in a variable length option field of a Geneve header of the packet, or in a Layer 7 payload of the packet.

20. The hypervisor of claim 15, wherein the special processing is based on one or more of: content of: destination MAC addresses of the packets, rules defined for the packets, or configuration instructions defined for the packets in control planes.

* * * * *